(12) United States Patent
del Rosario et al.

(10) Patent No.: US 8,949,149 B2
(45) Date of Patent: Feb. 3, 2015

(54) ATTRIBUTE BASED INVENTORY USAGE AND STOCKING

(75) Inventors: Francis E. del Rosario, Rochester, MN (US); Kael B. Eddy, Lanesboro, MN (US); Clinton W. Erie, Adams, MN (US); Ivory W. Knipfer, Rochester, MN (US); Matthew H. Zemke, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1294 days.

(21) Appl. No.: 11/964,480

(22) Filed: Dec. 26, 2007

(65) Prior Publication Data

US 2009/0171816 A1 Jul. 2, 2009

(51) Int. Cl.
*G06Q 10/00* (2012.01)
*A01K 5/02* (2006.01)
*G06Q 10/08* (2012.01)

(52) U.S. Cl.
CPC .......... *G06Q 10/087* (2013.01); *G06Q 10/0875* (2013.01)
USPC .............................................. 705/28; 705/29

(58) Field of Classification Search
USPC ........................................................ 705/28
See application file for complete search history.

(56) References Cited

U.S. PATENT DOCUMENTS

2005/0216366 A1 * 9/2005 Vincent et al. .................. 705/28

FOREIGN PATENT DOCUMENTS

JP 2003137435 10/2001

OTHER PUBLICATIONS

Cuneo, E.C.; Subaru's Smart Parts Process; Inspec,InformationWEEK, Issue 942, 51, Jun. 2, 2003.
Lovejoy, W.S.; Suboptimal Policies, With Bounds,for Parameter Adaptive Decision Processes; Inspec, Operations Research, vol. 41, Issue 3, May-Jun. 1993.
Umeda, S., et al; Design Specifications of a Generic Supply Chain Simulator; ACM Digital Library, Proceedings of the 2004 Winter Simulation Conference; 2004.
Mathur, Mahesh; Inventory Cost Model for 'Just-in-Time' Production; Proceedings of the 1994 Winter Simulation Conference; 1994.

* cited by examiner

*Primary Examiner* — Ryan Zeender
*Assistant Examiner* — Denisse Ortiz Roman
(74) *Attorney, Agent, or Firm* — Steven M. Greenberg, Esq.; CRGO Law

(57) ABSTRACT

A novel and non-obvious method, system and apparatus for controlling inventory stocking and usage based on part attributes. A method for controlling inventory stocking and usage based on part attributes that can include establishing a stock footprint, which maps stocking locations to attributes on a part, establishing a usage strategy, which maps a prioritized list of attributes to a part request order type, establishing a usage characteristic set, which maps a set of usage characteristics to the usage strategy, receiving a request order, and, applying the established usage strategy to the received request order based on matching a characteristic set of the received request order with the usage characteristic set of the established usage strategy.

20 Claims, 6 Drawing Sheets

STOCK FOOTPRINT

| Stock Area | Set Name | Stocking Location | Required Attributes <LIST> |
|---|---|---|---|
| CRIB | GENERIC | FC***G | <NULL> |
| CRIB | LOANER | FC***L | <LOANER> |
| CRIB | TESTED | FC***T | <TESTED> |
| CRIB | LOANER_TESTED | FC***B | <LOANER, TESTED> |
| CRIB | ISERIES | FC***I | <ISERIES> |

FIG. 5

USAGE STRATEGY

| Stock Area | Request Type | Priority | Characteristic Set | Prioritized Part Attributes |
|---|---|---|---|---|
| CRIB | FC_ORDER | 10 | TYPICAL_CRIB | 1. LOANER<br>2. LOANER_TESTED<br>3. TESTED<br>4. GENERIC |
| CRIB | FC_ORDER | 20 | SHORT_LEAD | 1. LOANER_TESTED<br>2. TESTED<br>3. LOANER<br>4. GENERIC |
| CRIB | FC_ORDER | 30 | ISERIES_SYS | 1. ISERIES<br>2. LOANER<br>3. LOANER_TESTED<br>4. GENERIC<br>5. TESTED |
| CRIB | FC_ORDER | 40 | LOANER_SYS | 1. TESTED<br>2. GENERIC |
| CRIB | DEBUG | 10 | SPARE_PART | 1. LOANER_TESTED<br>2. LOANER<br>3. TESTED<br>4. GENERIC |
| CRIB | DEBUG | 20 | SPARE_LOANER | 1. TESTED<br>2. GENERIC |

FIG. 6

USAGE CHARACTERISTIC SETS

| Characteristic Set | Order Type | Machine Type | Model | BOM | Part Number | Loaner Order | Days to Ship |
|---|---|---|---|---|---|---|---|
| TYPICAL_CRIB | *ALL | NOT 940* | *ALL | *ALL | *ALL | N | >2 |
| SHORT_LEAD | *ALL | *ALL | *ALL | *ALL | *ALL | N | <3 |
| ISERIES_SYS | *ALL | 940* | *ALL | *ALL | *ALL | N | *ALL |
| LOANER_SYS | *ALL | *ALL | *ALL | *ALL | *ALL | Y | *ALL |
| SPARE_LOANER | *ALL | *ALL | *ALL | *ALL | *ALL | Y | *ALL |
| SPARE_PART | *ALL | *ALL | *ALL | *ALL | *ALL | N | *ALL |

FIG. 7

STOCKING CHARACTERISTIC SETS

| Characteristic Set | Order Type | Machine Type | Model | Operation Complete | Part Number | Loaner Order | Days to Ship |
|---|---|---|---|---|---|---|---|
| ISERIES_TEST | *ALL | 940* | *ALL | TEST | *ALL | N | *ALL |
| LOANER_SYS | *ALL | *ALL | *ALL | *ALL | *ALL | Y | *ALL |

FIG. 9

STOCKING STRATEGY 800

| Request Area | Request Type | Priority | Part Number | Cost | Part Attributes <LIST> | Characteristic Set | Stock Area | Set Name Required | Max Stock Qty |
|---|---|---|---|---|---|---|---|---|---|
| BUILD_* | RMV_PART | 10 | *ALL | >$10 | <DEFECTIVE> | <NULL> | NCM | DEFECTIVE | * |
| BUILD_* | RMV_PART | 20 | *ALL | * | <DEFECTIVE> | <NULL> | SCRAP | <NULL> | * |
| BUILD_* | RMV_PART | 110 | HDD_ASSY_LIST | * | *ALL | ISERIES_TEST | CRIB | ISERIES | 25 |
| BUILD_* | RMV_PART | 120 | HDD_ASSY_LIST | * | *ALL | ISERIES_TEST | SUB_BUILD | REWORK | * |
| BUILD_* | RMV_PART | 130 | *ALL | * | <LOANER, TESTED> | <NULL> | CRIB | LOANER_TESTED | * |
| BUILD_* | RMV_PART | 140 | *ALL | * | <LOANER> | <NULL> | =REQ AREA | LOANER | * |
| BUILD_* | RMV_PART | 150 | *ALL | * | <LOANER> | <NULL> | CRIB | LOANER | * |
| BUILD_* | RMV_PART | 160 | *ALL | * | <TESTED> | <NULL> | CRIB | TESTED | * |
| BUILD_* | RMV_PART | 170 | *ALL | * | *ALL | <NULL> | =REQ AREA | GENERIC | * |
| BUILD_* | RMV_PART | 180 | *ALL | * | *ALL | <NULL> | CRIB | GENERIC | * |
| 802 | 804 | 806 | 808 | 810 | 812 | 814 | 816 | 818 | 820 |

FIG. 8

ATTRIBUTE BASED INVENTORY USAGE AND STOCKING

BACKGROUND OF THE INVENTION

1. Statement of the Technical Field

The present invention relates to integrated supply chain systems and more particularly to attribute based inventory usage and inventory stocking.

2. Description of the Related Art

Generally, in integrated supply chain manufacturing systems, customers access an order management system to place product orders via a user interface, e.g., via a computer in communication with the Internet. Upon the generation of a valid order, a production configure to order (CTO) process is performed. CTO orders identify the parts or components that are needed for manufacturing of a certain product. These parts or components are stocked in various storage locations until identified and pulled for usage in the products.

Many manufacturing processes can create attributes e.g. pre-tested, microcode, activations, loaner units, etc., that differentiate parts, and thus, all parts with a given part number and/or engineering change (EC) number are not necessarily equivalent. However, current industry standard inventory systems continue to treat a part number as an absolute and therefore, lack visibility with respect to the attributes associated with a part number. As a result, current industry inventory systems are unable to determine if any different manufacturing activities should occur as a consequence of one or more part attributes. Manufacturers' attempts to stock, allocate and/or prioritize parts with associated attributes have met with little success. Consequently, numerous problems are encountered such as excess inventory as the wrong part attributes are used in the wrong manufacturing application, incorrect shipments due to loss of control of the attributes of a part, loss in warranty by accidentally overusing pre-tested/run-time parts, increased scrap when mistakes are found, additional cost and space requirements in an attempt to perform complete physical separation for inventory management.

One proposed solution is to generate a new part number and re-label the part each time the attributes of that part change. Such a "re-part numbering" scheme would result in an explosion of part numbers for every combination of attributes. For example, if the number of attributes identified for a particular part was five, this would result in a total of thirty-two part numbers. Instead, assume the number of attributes identified for a particular part was ten; this would result in a total of one thousand twenty-four part numbers. Consequently, the effort and resources required to support a full "re-part numbering" scheme is not practical.

Another proposed solution is to provide serialized tracking on all parts. A significant increase in workload would result for the handling and/or scanning of each and every part for every related material event. Some systems attempt to provide attribute labels on all parts and then manually determine if the part is valid for a particular use based on the identified attributes. There are numerous drawbacks with the use of such attribute labels, such as the labels are not always placed on the parts, many labels will fall off, and/or the labels may not updated as attributes change.

Still another proposed solution is for complete physical separation based on part number attributes. However, such a physical separation scheme does not support multiple attributes on a part and if it did, it would result in an explosion of required stocking locations.

SUMMARY OF THE INVENTION

The present invention addresses the deficiencies of the art with respect to manufacturing, and provides a novel and non-obvious method, system and apparatus for controlling inventory stocking and inventory usage based on part attributes. In one embodiment of the invention, a method for inventory stocking and inventory usage based on part attributes can be provided. The method can include establishing a stock footprint, which maps stocking locations to attributes on a part, establishing a usage strategy, which maps a prioritized list of attributes to a part request order type, establishing a usage characteristic set, which maps a set of usage characteristics to the usage strategy, receiving a request order, and, applying the established usage strategy to the received request order based on matching a characteristic set of the received request order with the usage characteristic set of the established usage strategy.

In one aspect of the embodiment, the method further can include establishing a stocking strategy, which maps a prioritized list of attributes to a stocking order request type, establishing a stocking characteristic set, which maps a set of stocking characteristics to the stocking strategy, receiving a stocking request order, and, applying the established stocking strategy to the received stocking request order based on matching a characteristic set of the received stocking request order with the stocking characteristic set of the established stocking strategy.

In another preferred embodiment of the invention, a method for inventory stocking based on part attributes can be provided. The method can include establishing a stocking strategy, which maps a prioritized list of attributes to a stocking order request type, establishing a stocking characteristic set, which maps a set of stocking characteristics to the stocking strategy, receiving a stocking request order, and, applying the established stocking strategy to the received stocking request order based on matching a characteristic set of the received stocking request order with the stocking characteristic set of the established stocking strategy.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 5 is a table containing examples of a stock footprint employed to relate stocking locations to the attributes of parts when stocked at the designated inventory location;

FIG. 6 is a table containing examples of a usage strategy employed to specify a prioritized list of attributes to be used when a particular request type is executed;

FIG. 7 is a table containing examples of usage characteristic sets employed to specify a more detailed "match" list to be used for selection of a usage strategy;

FIG. 8 is a table containing examples of a setup stocking strategy employed to specify a prioritized list of attributes to be used when a particular stocking request type is executed; and FIG. 9 is a table containing examples of stocking characteristic sets employed to specify a more detailed "match" list to be used for selection of a stocking strategy.

DETAILED DESCRIPTION OF THE INVENTION

Embodiments of the present invention provide a method, system and computer program product for controlling inventory stocking and usage based on part attributes. In accordance with an embodiment of the present invention, attributes of parts created during manufacturing activities can be identified and used to control inventory stocking and inventory usage in material management systems of integrated supply chain systems. A relationship between a stock footprint, a usage strategy and a usage characteristic set, can be identified and then used to determine which usage strategy to apply to a part request received by the inventory stocking and inventory usage system. In this way, a method to model, control and automate material (inventory) stocking and usage of part numbers based on part attributes is provided.

Figure 1:
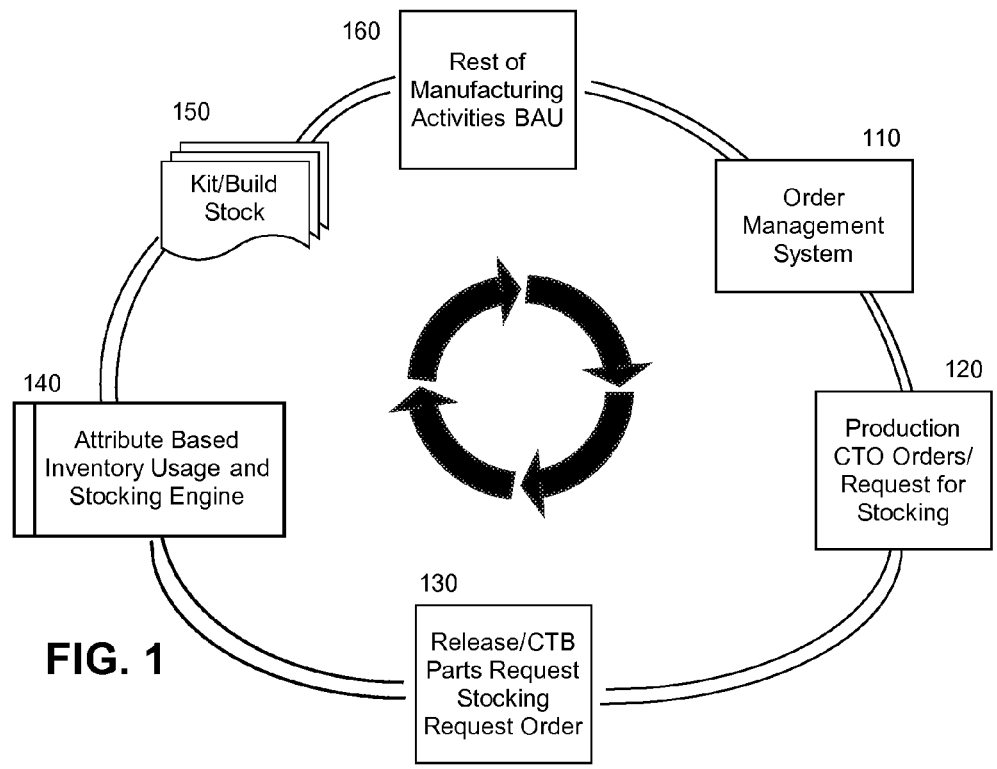
FIG. 1 is a pictorial illustration of a manufacturing supply chain network incorporating an attribute based inventory usage and stocking engine.

In illustration, FIG. 1 is a pictorial illustration of a manufacturing supply chain network incorporating an attribute based inventory and stocking engine. When a product is ordered, related materials, parts and components regarding the configuration of the order are determined by an order management system 110. The order management system 110 generates a production configure to order (CTO) 120. Upon issuing a CTO order 120, the order management system 110 can generate a release or clear to build (CTB) 130 in which the location of the necessary parts, e.g., the building, area and bin, is specified. The parts kit or build 150 can then be pulled from the identified locations and provided to the manufacturing floor for other manufacturing activities and test 160. Many of the manufacturing activities and processes can create attributes e.g. pre-tested, microcode, activations, loaner units, returned units, part removal, etc. for the parts. These created attributes can result in parts that are identified with the same part number, but can have different part characteristics.

Figure 2:
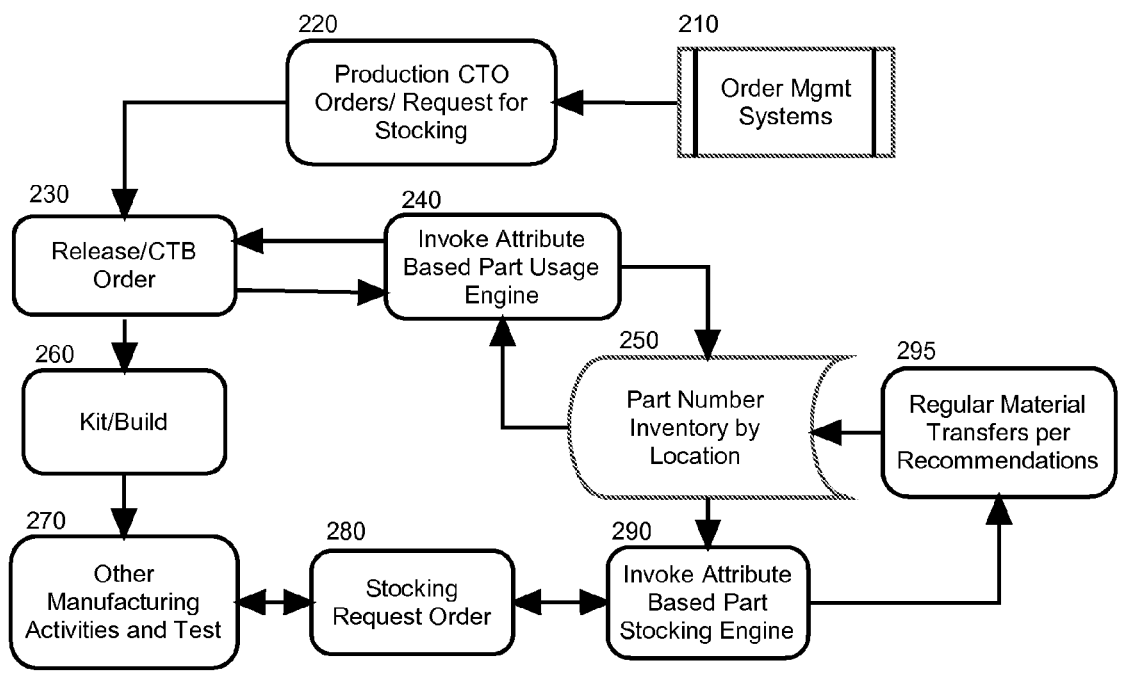
FIG. 2 is a flowchart illustrating a process for attribute based inventory usage and inventory stocking in a manufacturing supply chain process.

In further illustration, FIG. 2 is a flowchart illustrating a process for attribute based inventory usage and inventory stocking in a manufacturing supply chain process. In block 240, an attribute based inventory usage engine can be invoked during the order configuration development process. The attribute based inventory usage engine can supply a set of new or changed "usage strategies" to a CTB/Parts Request Order in block 230 to control which part numbers in inventory in block 250 should be used in a product kit/build in block 260.

The attribute based inventory usage engine can have computer code enabled to analyze the product configuration orders and modify them with new or changed "usage strategies" responsive to a prioritized list of attributes associated with a particular request type. The attribute based inventory usage engine is discussed in great detail with reference to FIG. 3. Request types and usage characteristic sets are discussed in greater detail with reference to the tables of FIGS. 5, 6 and 7.

In block 290, an attribute based inventory stocking engine can be invoked during a manufacturing or return process. In block 280, a stocking request order can be submitted and processed by the attribute based inventory stocking engine of block 290. The attribute based inventory stocking engine can supply a set of new or changed "stock strategies" to a stocking request order to determine which areas and locations the part numbers identified in the stocking request order are to be stocked. The attribute based inventory stocking engine can have computer code enabled to analyze the product stocking request orders and modify them with new or changed "stocking strategies" responsive to a prioritized list of attributes associated with a particular request area, request type, part number and cost. The attribute based inventory stocking engine is discussed in great detail with reference to FIG. 4. Request areas, request types and stocking characteristic sets are discussed in greater detail with reference to the tables of FIGS. 5, 8 and 9. Furthermore, FIG. 5 illustrates a table 500 containing examples of a stock footprint employed to relate stocking locations to the attributes of parts when stocked at the designated inventory location. Both the attribute based inventory usage process and the attribute based inventory stocking process use the mapping shown in table 500 to ensure that location integrity is maintained. Each row of the table 500 shows the data corresponding to one stock area, while each column shows a particular value of one attribute of the stock area. The first column 502 of table 500 is populated with the type of a storage area, such as a "CRIB" storage area of a manufacturing floor. A stock area type may be represented using a number that corresponds to a type or can be represented by a character string that spells out the stock area type.

The second column 504 of table 500 is populated with a set name identifier that describes a corresponding attribute list for those parts stored in that stock area and stocking location. For example, a set name can be represented using a number or an alphanumeric character. In the first row of table 500, the set name is given as "GENERIC" for stock area "CRIB" at a stocking location identified as "FC*G". The third column 506 of table 500 is populated with a stocking location identifier. A stocking location identifier is used for products, e.g., part numbers (PNs) that have the attributes that correspond to the set name of column 502. The stocking location identifiers of the third column 506 of table 500** are typically defined in a material management system, e.g., material requirements planning (MRP) system. The stocking location names relate back to the attributes and are typically restricted to a single use per part number (PN) per stocking area to ensure no confusion of what attributes are associated to a stocking location.

The fourth column 508 of table 500 is populated with a listing of the required attributes, such as "NULL", "LOANER", "TESTED", "LOANER, TESTED", "ISERIES", etc. A required attributes list can be represented using a number that corresponds to a list or can be represented by a character string that spells out the required attribute. The specific attribute, e.g., "LOANER" can be one or more types of attributes related to one or more manufacturing activities that create or change attributes on a part, e.g., pretesting, disposition of an engineering change (EC) order, a returned part number, a loaner part, etc.

FIG. 6 is a table 600 containing examples of a usage strategy employed to specify a prioritized list of attributes to be used when a particular request type is executed. The mapping shown in table 600 is used by the attribute based inventory usage process to ensure that location integrity is maintained. Each row of the table 600 shows the data corresponding to a stock area, while each column shows one or more values associated with a request type and characteristic set of the stock area. The first column 602 of table 600 is populated with the type of a storage area, such as a "CRIB" storage area of a manufacturing floor. A stock area type provides for the segmentation of the stocking locations to a specific area.

The second column 604 of table 600 is populated with a request type that is used to specify a corresponding prioritized attribute list for a particular request type. For example, a request type can be represented using a number or an alphanumeric character. In the first row of table 600, the request type is given as "FC_ORDER" for stock area "CRIB" with a characteristic set identified as "TYPICAL_CRIB". The third column 606 of table 600 is populated with a priority value, which can be set by the system manager to prioritize the use of inventory by sequencing when multiple usage strategies exist for a particular request type and location. In one embodiment, the parts having the lowest priority value for a given request type will be used in product builds before other parts having a higher priority value.

The fourth column 608 of table 600 is populated with a usage characteristic set identifier, such as "TYPICAL_CRIB", "SHORT_LEAD", "ISERIES_SYS", "LOANER_SYS", "SPARE_PART", "SPARE_LOANER", etc. The usage characteristic set identifier is a named key that specifies an entire set of "matching" criteria for the selection of a given usage strategy.

The fifth column 610 of table 600 is populated with a listing of the prioritized part attributes, such as "LOANER", "TESTED", "LOANER_TESTED", "GENERIC", etc. A prioritized parts attributes list can be represented using a number that corresponds to a list or can be represented by a character string that spells out the prioritized parts attribute. The prioritized parts attributes list of column 610 of table 600 prioritizes the order in which the required attributes of column are to be used. For example, if the first priority cannot satisfy the production request, then the second priority is used, and so forth, until either the part and/or attribute is found to satisfy the request or no part can be found to meet the request.

In further illustration, FIG. 7 is a table containing more detailed description of the usage characteristic sets referenced in the fourth column 608 of table 600. As described above, a usage characteristic set is a named key that specifies an entire set of "matching" criteria for the selection of a given usage strategy. Each row of the table 700 shows the data corresponding to a usage characteristic set, while each column shows one or more characteristics, which make up a given characteristic set. The first column 702 of table 700 is populated with the type of usage characteristic set, such as a "TYPICAL_CRIB" and "SHORT_LEAD".

The second column 704 of table 700 is populated with an order type that is used to specify a single or multiple list of the types of orders, e.g., "SPARE", "NEW BOX", "OPTION/PART", "ALL", etc., for a given business. For example, in the first row of table 700, the order type is given as "*ALL" for the usage characteristic set identified as "TYPICAL_CRIB".

The third column 706 of table 700 is populated with a machine type, which is a form of "product indicator", e.g., 9406 is an iSeries server.

The fourth column 708 of table 700 is populated with a model indicator, which can be a subclass or distinction under a machine type for particular variations of a product. The fifth column 710 of table 700 is populated with a bill of material (BOM), which can contain information about a particular product without having to specify each part of that product. The sixth column 712 of table 700 is populated with a part number (PN), which can be used as an exception condition for selection of a usage strategy. The seventh column 714 of table 700 is populated with a loaner indicator, which can identify if the order is a loaner type of order. The eighth column 716 of table 700 is populated with a days to ship indicator, which can identify the number of days before shipment of this particular order. For example, the first row of Table 700 has a days to ship indicator of ">2" that indicates the order will not be shipped for at least 2 days.

In an embodiment, the usage characteristic sets of table 700 works with Boolean logic that assumes "AND" positive logic only, and therefore all the characteristics of a given usage characteristic set are necessary for the selection of the corresponding usage strategy. Other Boolean logic can be used to provide more complex relationships among the characteristics. Although, table 700 illustrates a total of seven characteristics for a given characteristic set, there may be more or less characteristics depending on a particular business's needs or requirements.

FIG. 8 is a table 800 containing examples of a stocking strategy employed to prioritize the stocking of attributes to be used when a request type is executed. The mapping shown in table 800 is used by the attribute based inventory stocking process to stock the parts for a specific usage. Each row of the table 800 shows data corresponding to a request area, while each column shows one or more values associated with a request type and characteristic set of the request area. The first column 802 of table 800 is populated with the type of a request area, such as a "BUILD_*", which is the manufacturing floor. A request area type allows for the segmentation of the stocking locations to be specific to an area.

The second column 804 of table 800 is populated with a request type that is used to specify a corresponding prioritized attribute list for a particular request type. For example, a request type can be represented using a number or an alphanumeric character. In the first row of table 600, the request type is given as "RMV_PART" for request area "BUILD_*" with a characteristic set identified as "<NULL>". The third column 806 of table 800 is populated with a priority value, which can be set by the system manager to prioritize the stocking of inventory by sequencing when multiple usage strategies exist for a particular request type and location.

The fourth column 808 of table 800 is populated with a part number (PN) identifier, which can be used to apply attributes by part number and manufacturing event or manufacturing event alone. The fifth column 810 of table 800 is populated with a cost identifier, which can be used as a condition for selection of a stocking strategy. The sixth column 812 of table 800 is populated with a parts attributes identifier, such as "<DEFECTIVE>", "*ALL", "<LOANER>", "<LOANER, TESTED>", etc. The parts attributes identifier provides a list of attributes in priority order and can be used to determine a stocking foot print when that record is selected. When the attributes are known in a requesting application, this information can be included as input and used to determine what attributes to apply to the part.

The seventh column 814 of table 800 is populated with a stocking characteristic set identifier, such as "<NULL>", "ISERIES_TEST", etc. The stocking characteristic set identifier is a named key that specifies an entire set of "matching" criteria for the selection of a given stocking strategy.

The eighth column 816 of table 800 is populated with a stock area identifier, such as "NCM", "TESTED", "SUB_BUILD", "SCRAP", "CRIB", etc. The stock area of column 816 of table 800 indicates the area where the part number attribute is to be stocked. The ninth column 818 of table 800 is populated with a set name required identifier, such as "DEFECTIVE", "<NULL>", "REWORK", "LOANER_TESTED", "GENERIC", etc. The stocking set name required identifier is a named secondary key used in the stocking footprint to selection a stocking location. The tenth column 820 of table 800 is populated with a "max stock qty" identifier, which can be used as a condition for selection of a stocking strategy.

In further illustration, FIG. 9 is a table containing more detailed description of the stocking characteristic sets referenced in the seventh column 814 of table 800. As described above, a stocking characteristic set is a named key that specifies an entire set of "matching" criteria for the selection of a given stocking strategy. Each row of the table 900 shows the data corresponding to a stocking characteristic set, while each column shows one or more characteristics, which make up a given characteristic set. The first column 902 of table 900 is populated with the type of stocking characteristic set, such as a "ISERIES_TEST" and "LOANER_SYS".

The second column 904 of table 900 is populated with an order type that is used to specify a single or multiple list of the types of orders, e.g., "SPARE", "NEW BOX", "OPTION/PART", "ALL", etc., for a given business. For example, in the first row of table 900, the order type is given as "*ALL" for the stocking characteristic set identified as "ISERIES_TEST". The third column 906 of table 900 is populated with a machine type, which is a form of "product indicator", e.g., 9406 is an iSeries server.

The fourth column 908 of table 900 is populated with a model indicator, which can be a subclass or distinction under a machine type for particular variations of a product. The fifth column 910 of table 900 is populated with an "operation complete", which can contain information about the types of manufacturing processes the part has undergone. The sixth column 912 of table 900 is populated with a part number (PN), which can be used as an exception condition for selection of a usage strategy. The seventh column 914 of table 900 is populated with a loaner indicator, which can identify if the order is a loaner type of order. The eighth column 916 of table 900 is populated with a days to ship indicator, which can identify the number of days before shipment of this particular order. For example, the first row of Table 900 has a days to ship indicator of "*ALL" that indicates the order will not be shipped until all production is complete.

In an embodiment, the stocking characteristic sets of table 900 works with Boolean logic that assumes "AND" positive logic only, and therefore all the characteristics of a given stocking characteristic set are necessary for the selection of the corresponding stocking strategy. Other Boolean logic can be used to provide more complex relationships among the characteristics. Although, table 900 illustrates a total of seven characteristics for a given characteristic set, there may be more or less characteristics depending on a particular business's needs or requirements.

Figure 3:
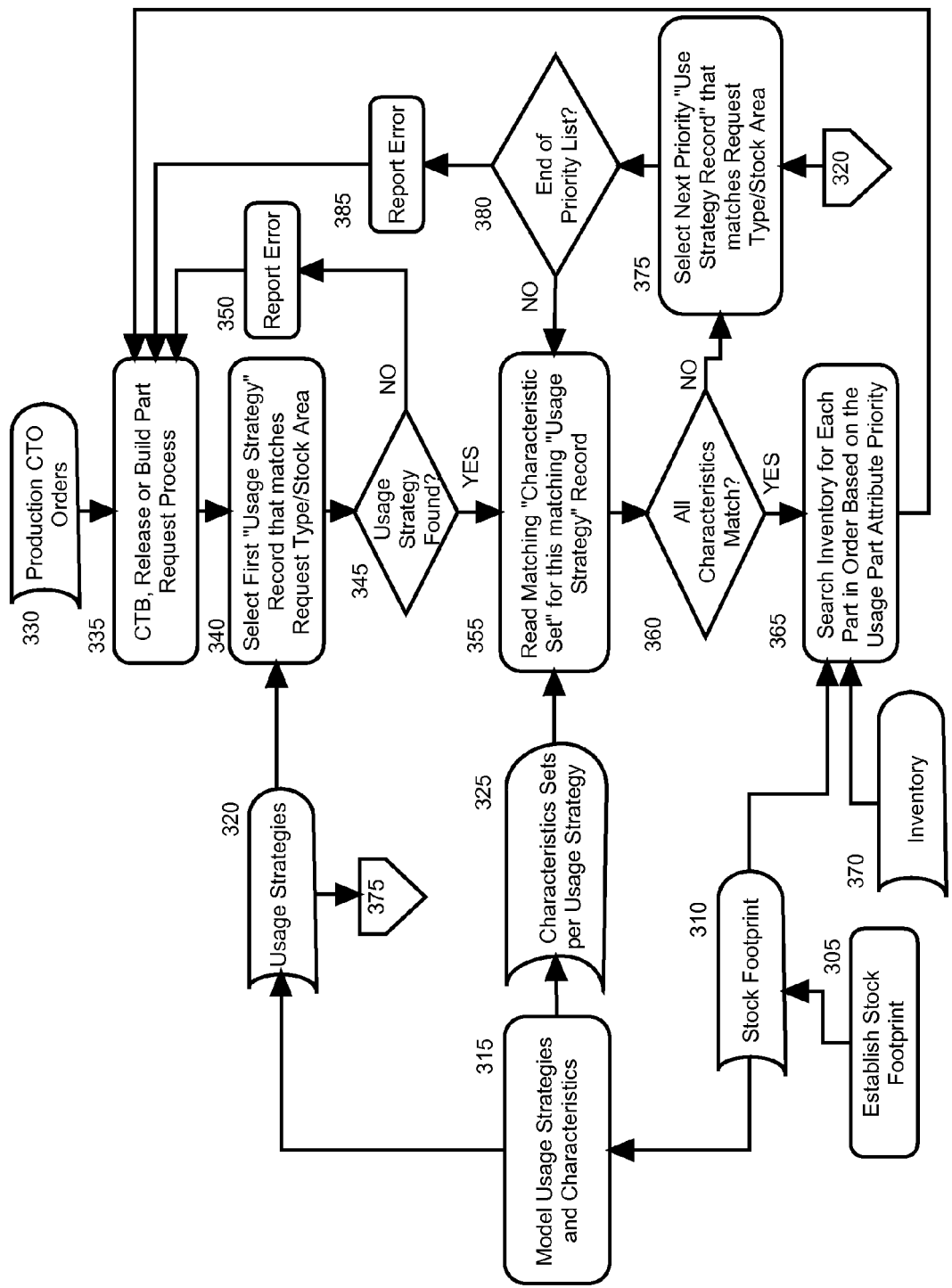
FIG. 3 is a flowchart illustrating a process for attribute based inventory usage for a manufacturing supply chain.

In still further illustration, FIG. 3 is a flowchart illustrating the attribute based inventory usage engine of FIG. 2. Beginning in block 305, a stock footprint can be established such as the examples illustrated in table 500 of FIG. 5 and can be stored in a stock footprint storage at block 310. The stock footprint relates stocking locations to the attributes expected on the parts stocked at the corresponding location. The valid stock footprints are supplied as inputs to the model usage strategies and characteristics logic in block 315 and are used to generate new or changed usage strategies in block 320 and the usage characteristic sets for each generated usage strategy in block 325. In block 330, a production configure to order (CTO) can be generated and processed to provide a release, build or clear to build (CTB) part request in block 335. In block 340, a first "usage strategy record" that matches the request type and stock area of the part request is selected from the usage strategies store in block 320. More than one usage strategy record can be provided by the usage strategies in block 320, e.g., a set of usage strategies having different priority levels that match the request type and stock area of the part request in block 335.

In decision block 345, a determination is made as to whether there are any usage strategies available for the specified part request order in block 335. If no usage strategy is identified, then an error report can be generated and sent to the material management system controller. If a usage strategy is identified, then the identified usage strategy is applied to the part request of block 335. For example, as illustrated in table 600 of FIG. 6, the first four rows each have a request type for order fulfillment, e.g., FC_ORDER, with different priority levels, e.g., 10, 20, 30, 40, etc., and different characteristic sets, e.g., TYPICAL_CRIB, SHORT_LEAD, ISERIES_SYS, LOANER_SYS, etc. In block 355, the matching characteristic set for the identified matching usage strategy record is read and compared to the part request order from block 335. If all the characteristics of the part request order match the identified usage characteristic set then in block 360, a search of the inventory in block 370 for each part of the part request order can be made to identify available stock based on the usage part attribute priority. On the other hand, if all the characteristics of the part request order do not match the identified usage characteristic set, then in block 375, the process continues by seeking the next priority usage strategy record, if any. In decision block 380, a determination of whether there are additional usage strategy records can be made by determining if the end of priority list has been reached. If the end of the priority list has not been reached, the matching usage strategy record for that next priority level usage strategy is selected in block 355 and the process continues as described before with respect to block 360 and the following blocks. On the other hand, if the end of the priority list has been reached in block 380, then an error report can be generated and sent to the material management system controller in block 385.

Figure 4:
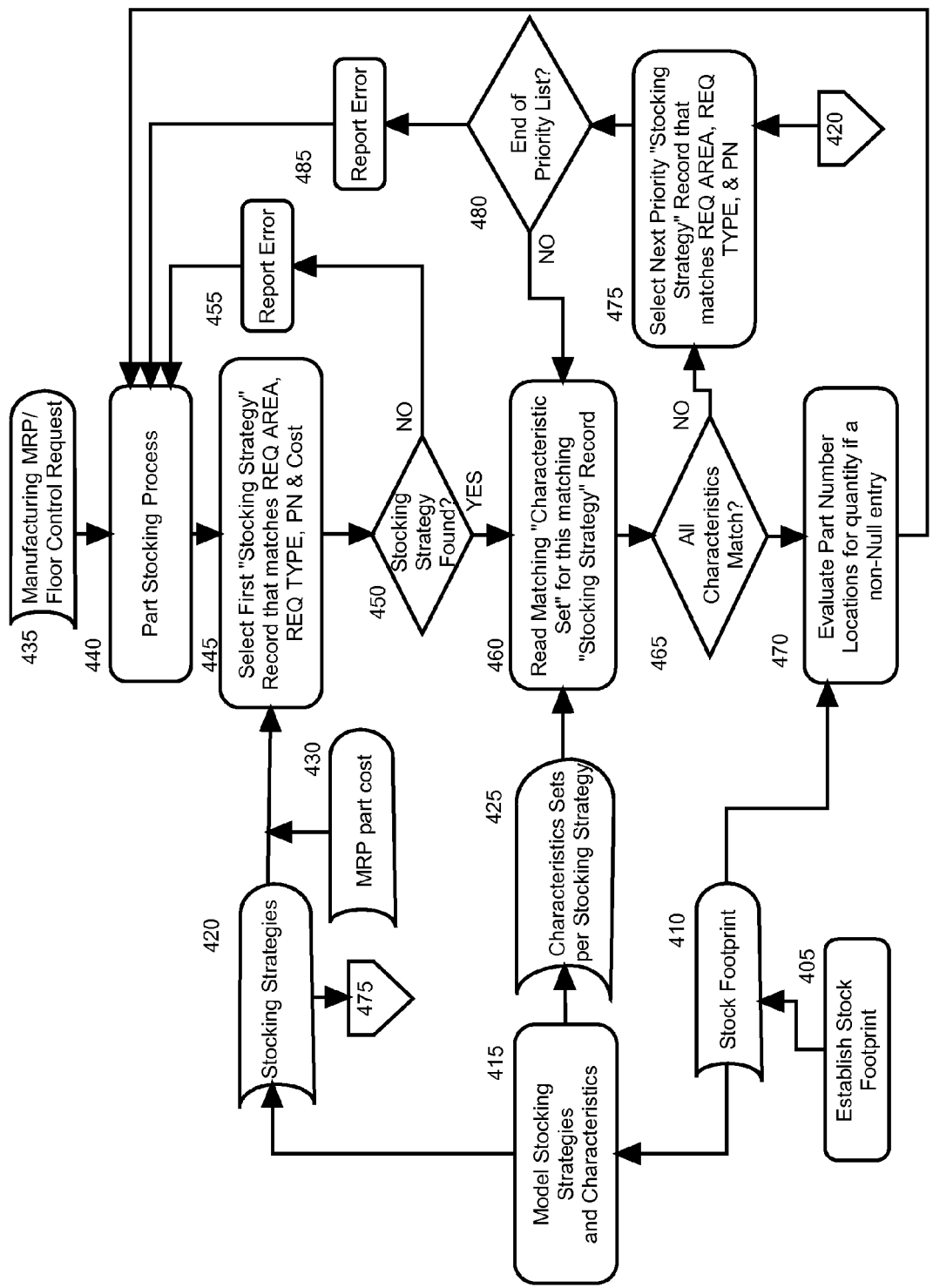
FIG. 4 is a flowchart illustrating a process for attribute based inventory stocking for a manufacturing supply chain.

In still further illustration, FIG. 4 is a flowchart illustrating the attribute based inventory stocking engine of FIG. 2. Beginning in block 405, a stock footprint can be established such as the examples illustrated in table 500 of FIG. 5 and can be stored in a stock footprint storage at block 410. The stock footprint relates stocking locations to the attributes expected on the parts stocked at the corresponding location. The valid stock footprints are supplied as inputs to the model stocking strategies and characteristics logic in block 415 and are used to generate new or changed stocking strategies in block 420 and the stocking characteristic sets for each generated stocking strategy in block 425. In block 430, optional part cost characteristics are provided to the stocking strategies of block 420. In block 435, a materials requirements planning (MRP) or floor control request order can be generated and provided to a part stocking process in block 440. In block 445, a first "stocking strategy" record that matches the request area, request type and part number of part stocking request is selected from the stocking strategies store in block 420. More than one stocking strategy record can be provided by the stocking strategies in block 420, e.g., a set of stocking strategies having different priority levels that match the request type and request area of the part request of block 435.

In decision block 450, a determination is made as to whether there are any stocking strategies available for the specified stocking request order in block 435. If no stocking strategy is identified, then in block 455 an error report can be generated and sent to the material management system controller. If a stocking strategy is identified, then the identified stocking strategy is applied to the part request of block 435. For example, as illustrated in table 800 of FIG. 8, the first four rows each have a request type for removal of a part, e.g., RMV_PART, with different priority levels, e.g., 10, 20, 110, 120, etc. The first two rows are applicable to all part numbers, e.g., *ALL while the third and fourth rows are applicable to specific part numbers, e.g., HDD_ASSY_LIST. The part numbers may also have optional cost characteristics, for example the first row has a part cost characteristic of ">$10", which would need to match the stocking order of block 435 in order for the application of the stocking strategy of the first row.

In block 460, the matching characteristic set for the identified matching stocking strategy record is read and in block 465 is compared to the part request order from block 435. If all the characteristics of the part request order, e.g., stock area, set name, PN, attribute (optional), maximum quantity (optional), match the identified stocking characteristic set and then in block 470, an evaluation of the part number locations is performed to quantify if the location is not a null set and a return of a PN with a corresponding location is returned to the business as usual (BAU) part stocking process in block 440. On the other hand, if all the characteristics of the part stocking request order do not match the identified stocking characteristic set, then in block 475, the process continues by seeking the next priority stocking strategy record, if any. In decision block 480, a determination of whether there are additional stocking strategy records can be made by determining if the end of the priority list has been reached. If the end of the priority list has not been reached, the matching stocking strategy record for that next priority level stocking strategy is selected in block 455 and the process continues as described before with respect to block 460 and the following blocks. On the other hand, if the end of the priority list has been reached in block 480, then an error report can be generated and sent to the material management system controller in block 485.

The present invention can be realized in hardware, software, or a combination of hardware and software. An implementation of the method and system of the present invention can be realized in a centralized fashion in one computer system or in a distributed fashion where different elements are spread across several interconnected computer systems. Any kind of computer system, or other apparatus adapted for carrying out the methods described herein, is suited to perform the functions described herein.

A typical combination of hardware and software could be a general-purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method, by a computer hardware system for controlling inventory stocking and usage based on part attributes, the method comprising:
   establishing, by the computer hardware system, a stock footprint, the stock footprint mapping stocking locations to attributes on a part;
   establishing, by the computer hardware system, the usage strategy mapping a prioritized list of attributes to a part request order type;
   establishing, by the computer hardware system, a usage characteristic set, the usage characteristic set mapping a set of usage characteristics to the usage strategy;

receiving, by the computer hardware system, a request order; and applying, by the computer hardware system, the established usage strategy to the received request order based on matching a characteristic set of the received request order with the usage characteristic set of the established usage strategy.

2. The method of claim 1, wherein the establishing a stock footprint comprises associating a stocking location in a stock area with a set name and list of part attributes.

3. The method of claim 1, wherein establishing a usage strategy comprises associating a request type with a stock area and a usage strategy priority level.

4. The method of claim 3, further comprising modifying the usage strategy based on the stock footprint.

5. The method of claim 4, wherein the modifying the usage strategy based on the stock footprint comprises modifying the part attributes at a stocking location.

6. The method of claim 1, further comprising searching the inventory for each part identified in the request order based on a usage strategy prioritized part attribute.

7. The method of claim 1, further comprising:
establishing a stocking strategy, the stocking strategy mapping a prioritized list of attributes to a stocking order request type;
establishing a stocking characteristic set, the stocking characteristic set mapping a set of stocking characteristics to the stocking strategy;
receiving a stocking request order; and,
applying the established stocking strategy to the received stocking request order based on matching a characteristic set of the received stocking request order with the stocking characteristic set of the established stocking strategy.

8. The method of claim 7, wherein establishing a stocking strategy comprises associating a request type with a request area and a stocking strategy priority level.

9. The method of claim 7, further comprising evaluating the inventory locations for quantity if record is a non-null entry.

10. The method of claim 8, further comprising modifying the stocking strategy based on the stock footprint.

11. The method of claim 10, wherein the modifying the stocking strategy based on the stock footprint comprises modifying the part attributes at a stocking location.

12. A method, by a computer hardware system for controlling inventory stocking based on part attributes, the method comprising:
establishing, by the computer hardware system a stock footprint, the stock footprint mapping stocking locations to attributes on a part;
establishing, by the computer hardware system a stocking strategy, the stocking strategy mapping a prioritized list of attributes to a stocking order request type;
establishing, by the computer hardware system a stocking characteristic set, the stocking characteristic set mapping a set of stocking characteristics to the stocking strategy;
receiving, by the computer hardware system a stocking request order; and
applying, by the computer hardware system the established stocking strategy to the received stocking request order based on matching a characteristic set of the received stocking request order with the stocking characteristic set of the established stocking strategy.

13. The method of claim 12, wherein establishing a stocking strategy comprises associating a request type with a request area and a stocking strategy priority level.

14. The method of claim 13, further comprising modifying the stocking strategy based on the stock footprint.

15. The method of claim 14, wherein the modifying the stocking strategy based on the stock footprint comprises modifying the part attributes at a stocking location.

16. The computer program product of claim 14, further comprising computer usable program code for modifying the usage strategy based on the stock footprint.

17. The method of claim 12, further comprising evaluating the inventory locations for quantity if record is a non-null entry.

18. A computer program product comprising a non-transitory computer usable medium, embodying computer usable program code for controlling inventory stocking and usage based on part attributes, the computer program product comprising:
computer usable program code for establishing a stock footprint, the stock footprint mapping stocking locations to attributes on a part;
computer usable program code for establishing a usage strategy, the usage strategy mapping a prioritized list of attributes to a part request order type;
computer usable program code for establishing a usage characteristic set, the usage characteristic set mapping a set of usage characteristics to the usage strategy;
computer usable program code for receiving a request order; and,
computer usable program code for applying the established usage strategy to the received request order based on matching a characteristic set of the received request order with the usage characteristic set of the established usage strategy.

19. The computer program product of claim 18, wherein the computer usable program code for establishing a stock footprint comprises associating a stocking location in a stock area with a set name and list of part attributes.

20. The computer program product of claim 18, wherein the computer usable program code for establishing a usage strategy comprises associating a request type with a stock area and a usage strategy priority level.

* * * * *